United States Patent
Rink et al.

[11] Patent Number: 5,884,938
[45] Date of Patent: Mar. 23, 1999

[54] PRESSURIZED FLUID CONTAINING AIRBAG INFLATOR

[75] Inventors: Karl K. Rink, Liberty; David J. Green, Brigham City; Bradley W. Smith, Ogden; Marcus T. Clark, Kaysville, all of Utah

[73] Assignee: Autoliv ASP Inc., Ogden, Utah

[21] Appl. No.: 935,016

[22] Filed: Sep. 22, 1997

Related U.S. Application Data

[63] Continuation-in-part of Ser. No. 632,698, Apr. 15, 1996, Pat. No. 5,669,629.

[51] Int. Cl.$^6$ .................................................. B60R 21/28
[52] U.S. Cl. .......................................... 280/741; 280/737
[58] Field of Search .................................... 280/737, 741

[56] References Cited

U.S. PATENT DOCUMENTS

| | | | |
|---|---|---|---|
| 651,132 | 6/1900 | Davis . | |
| 1,056,560 | 3/1913 | Lippincott . | |
| 1,805,721 | 5/1931 | Kogl . | |
| 2,334,211 | 11/1943 | Miller | 23/282 |
| 2,403,932 | 7/1946 | Lawson | 252/186 |
| 2,995,987 | 8/1961 | Fitzpatrick | 89/7 |
| 3,664,134 | 5/1972 | Seitz | 60/274 |
| 3,674,059 | 7/1972 | Stephenson | 141/4 |
| 3,862,866 | 1/1975 | Timmerman et al. | 149/21 |
| 3,884,497 | 5/1975 | Massengill et al. . | |
| 3,958,949 | 5/1976 | Plantif et al. | 23/281 |
| 3,964,256 | 6/1976 | Plantif et al. | 60/219 |
| 3,986,456 | 10/1976 | Doin et al. | 102/39 |
| 4,050,483 | 9/1977 | Bishop | 141/4 |
| 5,031,932 | 7/1991 | Frantom et al. | 280/741 |
| 5,060,973 | 10/1991 | Giovanetti | 280/736 |
| 5,076,607 | 12/1991 | Woods et al. | 280/737 |
| 5,171,385 | 12/1992 | Michels et al. | 149/19.1 |
| 5,230,531 | 7/1993 | Hamilton et al. | 280/737 |
| 5,330,730 | 7/1994 | Brede et al. | 422/305 |
| 5,348,344 | 9/1994 | Blumenthal et al. | 280/737 |
| 5,428,988 | 7/1995 | Starkovich | 74/40 |
| 5,452,661 | 9/1995 | Neff | 102/202.7 |
| 5,464,248 | 11/1995 | Sasaki et al. | 280/741 |
| 5,466,313 | 11/1995 | Brede et al. | 149/1 |
| 5,470,104 | 11/1995 | Smith et al. | 280/737 |
| 5,494,312 | 2/1996 | Rink | 280/737 |
| 5,504,288 | 4/1996 | Morin | 200/83 P |
| 5,531,473 | 7/1996 | Rink et al. | 280/737 |
| 5,536,339 | 7/1996 | Verneker | 149/19.5 |
| 5,580,086 | 12/1996 | McAlister | 280/737 |
| 5,582,806 | 12/1996 | Skanberg et al. | 422/305 |

FOREIGN PATENT DOCUMENTS

| | | |
|---|---|---|
| 0757975 | 2/1997 | European Pat. Off. . |
| 2111442 | 6/1972 | France . |
| 4303169 | 4/1994 | Germany . |

OTHER PUBLICATIONS

Radioflo Theory Training Manual, Jan. 1997 by IsoVac Engineering, Inc., pp. T–1 through T–27.

"Leak Testing Electronic Devices in Production Quantities" by George Neff and Jimmie Neff reprint from Microelectronic Manufacturing and Testing, Sep. 1986.

Patent Abstract of Japan, vol. 005, No. 156 (C–074), 06 Oct. 1981 & JP 56 088804 A (Toshiba Battery Co. Ltd.), 18 Jul. 1981.

"New Branching Ratio for $Kr^{85}$" by Klaus W. Geiger, Janet S. Merritt and John G.V. Taylor, Nucleonics, Jan. 1961.

IsoVac Engineering, Inc. History & Background, 2 pages, undated.

*Primary Examiner*—Kenneth R. Rice
*Attorney, Agent, or Firm*—Sally J. Brown

[57] ABSTRACT

Apparatuses for inflating inflatable devices and associated methods of leak detection relying on the inclusion of a radioactive isotope leak trace material.

41 Claims, 6 Drawing Sheets

PRESSURIZED FLUID CONTAINING AIRBAG INFLATOR

CROSS REFERENCE TO RELATED APPLICATION

This application is a continuation-in-part application of application, U.S. Ser. No. 08/632,698, filed on Apr. 15, 1996 now U.S. Pat. No. 5,669,629. The co-pending application is hereby incorporated by reference herein and made a part hereof, including but not limited to those portions which specifically appear hereinafter.

BACKGROUND OF THE INVENTION

This invention relates generally to pressurized fluid-containing devices and, more particularly, to such a device used in the inflation of an inflatable device such as an inflatable vehicle occupant restraint airbag cushion used in inflatable restraint systems.

It is well known to protect a vehicle occupant using a cushion or bag, e.g., an "airbag cushion," that is inflated/expanded with gas when the vehicle encounters sudden deceleration, such as in a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as "an inflator."

Many types of inflator devices have been disclosed in the art for inflating an inflatable restraint system airbag cushion. One category of such inflator devices is often referred to as "compressed gas inflators" and refers to various inflators which contain compressed gas.

In one particular type of compressed gas inflator, commonly referred to as a "stored gas inflator," the inflator simply contains a quantity of a stored compressed gas which is selectively released to inflate an associated airbag cushion. Unfortunately, to properly inflate a typically sized airbag cushion at an appropriate rate, such an inflator commonly requires the storage of a relatively large volume of gas at relatively high pressures. As a result of such high storage pressures, the walls of the gas storage chamber of such an inflator are typically relatively thick for increased strength. The combination large volume and thick walls typically results in a relatively heavy and bulky inflator design. In addition, the operation of such an inflator device requires the design and provision of a technique to initiate the release of the stored gas into the airbag cushion, when desired.

In a second type of compressed gas inflator, commonly referred to as a hybrid inflator, inflation gas results from a combination of stored compressed gas and the combustion of a gas generating material, e.g., a pyrotechnic. Hybrid inflators that have been proposed heretofore have been subject to certain disadvantages. For example, such inflators commonly result in the production of a gas having a relatively high particulate content. The removal of such solid particulate material, such as by the incorporation of various filtering devices within or about the inflator, undesirably increases the complexity of the inflator design and processing and can increase the costs associated therewith.

In view of these and other related or similar problems and shortcomings of prior inflator devices, a new type an inflator, called a "fluid fueled inflator," has been developed. Such inflators are the subject of commonly assigned U.S. Pat. No. 5,470,104, Smith et al., issued Nov. 28, 1995; U.S. Pat. No. 5,494,312, Rink, issued Feb. 27, 1996; and U.S. Pat. No. 5,531,473, Rink et al., issued Jul. 2, 1996, the disclosures of which are fully incorporated herein by reference.

Such an inflator device utilizes a fuel material in the form of a fluid, e.g., in the form of a gas, liquid, finely divided solid, or one or more combinations thereof, in the formation of an inflation gas for an airbag cushion. One form of the fluid fuel inflator utilizes a compressed gas. In such a fluid fueled inflator, the fluid fuel material is burned to produce gas which contacts a quantity of stored pressurized gas to produce inflation gas for use in inflating a respective inflatable device.

While such an inflator can successfully overcome, at least in part, some of the problems associated with the above-identified prior types of inflator devices, there has been a continuing need and demand for further improvements in safety, simplicity, effectiveness, economy and reliability in the apparatus and techniques used for inflating an inflatable device such as an airbag cushion.

To that end, the above-identified pending application, U.S. Ser. No. 08/632,698, filed on Apr. 15, 1996, discloses a new type of inflator wherein a gas source material undergoes decomposition to form decomposition products including at least one gaseous decomposition product used to inflate an inflatable device.

Such an inflator can be helpful in one or more of the following aspects: reduction or minimization of concerns regarding the handling of content materials; production of relatively low temperature, non-harmful inflation gases; reduction or minimization of size and space requirements and avoidance or minimization of the risks or dangers of the gas producing or forming materials undergoing degradation (thermal or otherwise) over time as the inflator awaits activation.

In general, all inflators (including pyrotechnic-based inflators) have specific requirements and thus necessitate the checking of the inflators, or at least particular components thereof, for the presence of undesired leaks.

For example, in pyrotechnic inflators, the gas generating material may often be susceptible to undesirably absorbing water, such as from the ambient environment. Since pyrotechnic inflators are generally not pressurized, there is a potential for atmospheric moisture to diffuse into such an inflator. Thus, assuming the inflator is in a humid surrounding environment and the existence of a leak path into the inflator, moisture could potentially be absorbed into or by the generant. As a result, the inflator may not perform as optimally as desired, particularly if the inflator has been exposed to elevated amounts of moisture. Consequently, pyrotechnic inflators generally contain internal seals to prevent or minimize such entry of water or moisture into the device. During manufacture of the inflator, these internal seals are checked for the presence or occurrence of undesired leak paths.

Compressed gas inflators, such as described above, commonly require the presence of at least certain specified quantities of the compressed material in order for the inflator to perform in the designed for manner. In such inflators, it is generally desired that the amount(s) of stored compressed material(s) be maintained in the inflator within at least a certain tolerance in order to ensure proper operation of the inflator. While proper inflator operation can be variously defined, ultimately, an inflator and the associated airbag need provide adequate vehicle occupant protection over an extended period of time (typically 15 years or more) after original construction of the vehicle. Thus, beyond simple functioning of the inflator and deployment of the associated airbag, the airbag desirably deploys in the desired and proper manner.

There are various methods to determine the leakage rate of a compressed gas inflator. In practice, a typically preferred method involves the use of helium as a tracer gas in a compressed gas mixture. In such a method, a certain fraction of the composition of the stored gas which escapes from the inflator consists of helium. (The exact fraction of helium detected as a result of the leak may be equal, less than, or greater than the corresponding loading conditions of the originally stored compressed gas. The physics associated with these various situations, however, is beyond the scope of the present discussion. In general, however, these different situations are typically dependent on certain, particular factors such as the magnitude of the leak, the total pressure within the storage vessel, as well as the initial gas composition, for example.)

The leak rate of helium from a pressure vessel is normally detected using a mass spectrometer system. For this specific practice, the mass spectrometers are normally designed to detect the presence of helium in the gases constituting the sample. The utilization of helium in leak tracing is advantageous in several respects: a) First, since the presence of helium is rather rare in the atmosphere, background helium (or residual helium in the environment such as that surrounding the detection apparatus) is normally very low. As a result, the possibility of the mass spectrometer being falsely influenced and possibly producing a spurious signal is significantly reduced or minimized. b) Second, the mass spectrometer signals for certain different molecular species can be nearly the same. Consequently, the mass spectrometer signal produced or resulting from the presence or occurrence of one molecular species may interfere or mask the mass spectrometer signal produced or resulting from the presence or occurrence of a different molecular species. For example, the molecular weights of nitrous oxide and carbon dioxide are approximately 44.02 and 44.01, respectively. As a result, it is very difficult to distinguish between these molecular species via mass spectrometry. Helium, however, with a molecular weight of 4, produces a mass spectrometer signal that is relatively easily distinguishable from the signal produced by other potentially present species. c) Third, helium is a relatively small monatomic gas, facilitating the passage thereof through even relatively small or narrow leak paths.

Conventional helium leak detection techniques, however, suffer or potentially suffer from a number of problems or disadvantages. For example, in order to permit leak check to the relatively small range of leakage acceptable in airbag module inflators, it is commonly necessary to include relatively large amounts of helium in the compressed gas mixture. In practice, the amount of helium required will be dependent on factors such as the magnitude and type of leak, the design life of the inflator, and the criteria for adequate performance for the inflator as a function of time. However, the incorporation of even moderate amounts of helium within a compressed gas inflator is or can be disadvantageous as, for a given volume, the storage pressure of the contents is significantly increased. Conversely, at a given pressure, the storage volume needs to be increased in order to accommodate the mass of the added helium.

While the release of such stored helium would also normally contribute to the inflation of the associated airbag, the storage of a compressed gas mixture of two or more molecular species is typically more expensive than the storage of a single compressed gas molecular species. The use of two or more molecular species commonly necessitates the use of additional storage, handling, and mixing equipment.

A significant limitation on such use of helium in such leak detection schemes is that the leak rate from a pressure vessel normally cannot be accurately checked at a date substantially later than the date the inflator is manufactured, unless the helium concentration within the vessel is known. That is, unless the leak is of the type that the compressed gases (e.g., both the primary stored gas and the helium tracer gas) are escaping in equal proportion to that at which they were loaded (as in the original composition), then the leak rate determination will normally be in error. Since knowledge of the type of leak cannot be definitively known a priori, the making of such an assumption can result in significant error. Moreover, if a pressurized vessel is returned at a later date for the leak rate to be reevaluated, a helium leak rate determination may be inaccurate.

An additional possible limitation or drawback to the use of such helium leak detection techniques is that the occurrence or presence of liquid materials within the storage vessel may impede or "mask" the helium. For example, if a liquid with a relatively high surface tension is present in the vessel, such liquid could possibly flow into a hole through which gas would normally leak and may, at least temporarily inhibit the passage of the gaseous material leak passage and out of the inflator. However, with time, the liquid may no longer occupy the leak path and the stoppage of gas leakage therethrough may only be temporary.

In addition, though helium is relatively rare in the general atmosphere, it will be appreciated that relatively high background concentrations of helium can be created in manufacturing environments. This may necessitate that the tested vessel be isolated such as by being placed in a closed chamber in which a vacuum is created in the surrounding environment, with the helium leak rate then being determined. Such special handling can add significant time and expense to the manufacturing process.

Further, the use of helium may undesirably result in the addition of considerable expense to the cost of the inflator, both through the inherent cost of the helium itself, the cost of purchasing and maintaining the mass spectrometers, as well as the costs associated with the equipment required to store, mix, and handle the helium.

Thus, there is a need and a demand for a pressurized fluid-containing inflator design which facilitates leak detection.

Moreover, there remains a continuing need and a demand for an inflator device which satisfies one or more of the following objectives: increased simplicity of design, construction, assembly and manufacture; avoidance or minimization of the risks or problems associated with the storage, handling and dispensing of gas generant materials; permits even further reductions in assembly weight and volume or size; and realizes enhanced assembly and performance reliability.

SUMMARY OF THE INVENTION

A general object of the invention is to provide improvements in the leak detection of pressurized fluid-containing devices.

Another objective of the invention is to provide improvements in inflators such as used for inflating inflatable devices, such as an inflatable vehicle occupant restraint.

A more specific objective of the invention is to overcome one or more of the problems described above.

The general object of the invention can be attained, at least in part, through a specified apparatus for inflating an inflatable device. The specified apparatus includes a first chamber and an initiator. The first chamber contains at least one gas source material under pressure and a quantity of at least one radioactive isotope leak trace material whereby fluid leakage from the first chamber can be detected. In normal operation, the initiator initiates the gas source material, resulting in an inflation fluid used to inflate the inflatable device.

The invention further comprehends a method for detecting the occurrence of a leak from an otherwise closed chamber which contains a pressurized fluid. The chamber additionally initially contains a selected quantity of at least one radioactive isotope leak trace material. In accordance with one method of the invention, the detection of the occurrence of a leak from the chamber is done by measuring the reduction or change in the radioactive signals emanating from the chamber.

The prior art generally fails to:

1) Provide a convenient and accurate means by which to leak check a pressurized, fluid-containing chamber or vessel, such as may be included in an airbag inflator;

2) Correct problems and disadvantages, both actual and potential, which are inherent in the common application of helium as a leak detection material; including the increased size, weight and costs of an inflator, for example, as well as the increased manufacturing, equipment and personnel costs and expenses associated with such application;

3) Provides for the avoidance or minimization of possible leak paths from such pressure vessels, particularly pressurized fluid-containing airbag inflators;

4) Provide an apparatus and method wherein a material used to accomplish a leak check can, if desired, be directly included with a fuel source, such as to aid or assist in dissociation; and 5) Provide alternative and possibly safer, simpler or less costly techniques by which inflator devices can be appropriately filled with desired gas and liquid fluid materials.

The invention still further comprehends an apparatus for inflating an inflatable device which apparatus includes a first chamber and an initiator. The first chamber contains at least one gas source material under pressure and a quantity of $Kr^{85}$ leak trace material whereby fluid leakage from the first chamber can be detected. In normal operation, the initiator initiates the decomposition of the decomposable gas source material which, in turn, undergoes decomposition to form decomposition products including at least one gaseous decomposition product used to inflate the device.

The invention yet still further comprehends a method for detecting the occurrence of a leak from an otherwise closed pressurized fluid-containing chamber of an inflatable restraint system inflator. The pressurized fluid includes a gas source material which, upon initiation, results in an inflation fluid used to inflate an inflatable device. The chamber additionally initially contains a selected quantity of at least one radioactive isotope leak trace material. In accordance with the invention, the method of leak detection includes the step of measuring the change in the radioactive signals emanating from the chamber.

The invention also comprehends a method which includes the steps of:

a) providing a cryogenically formed solid mass of a first material within an at least partially open chamber;

b) providing a selected quantity of at least one radioactive isotope leak trace material within the at least partially open chamber; and c) thereafter, closing the chamber to initially contain both the first material and the leak trace material.

As used herein, references to "combustion," "combustion reactions" and the like are to be understood to generally refer to the exothermic reaction of a fuel with an oxidant.

References to "decomposition," "decomposition reactions" and the like are to be understood to refer to the splitting, dissociation or fragmentation of a single molecular species into two or more entities.

"Thermal decomposition" is a decomposition controlled primarily by temperature. It will be appreciated that while pressure may, in a complex manner, also influence a thermal decomposition such as perhaps by changing the threshold temperature required for the decomposition reaction to initiate or, for example, at a higher operating pressure change the energy which may be required for the decomposition reaction to be completed, such decomposition reactions remain primarily temperature controlled. Pressure may also cause one or more of the dissociative materials to liquefy. It should be understood or appreciated by one skilled in the art that with liquefaction, the corresponding change in density may cause significant changes in decomposition behavior.

"Exothermic thermal decomposition" is a thermal decomposition which liberates heat.

The term "equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi = (F/O)_A / (F/O)_S$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

Other objects and advantages will be apparent to those skilled in the art from the following detailed description taken in conjunction with the appended claims and drawings.

DETAILED DESCRIPTION OF THE INVENTION

Figure 1:
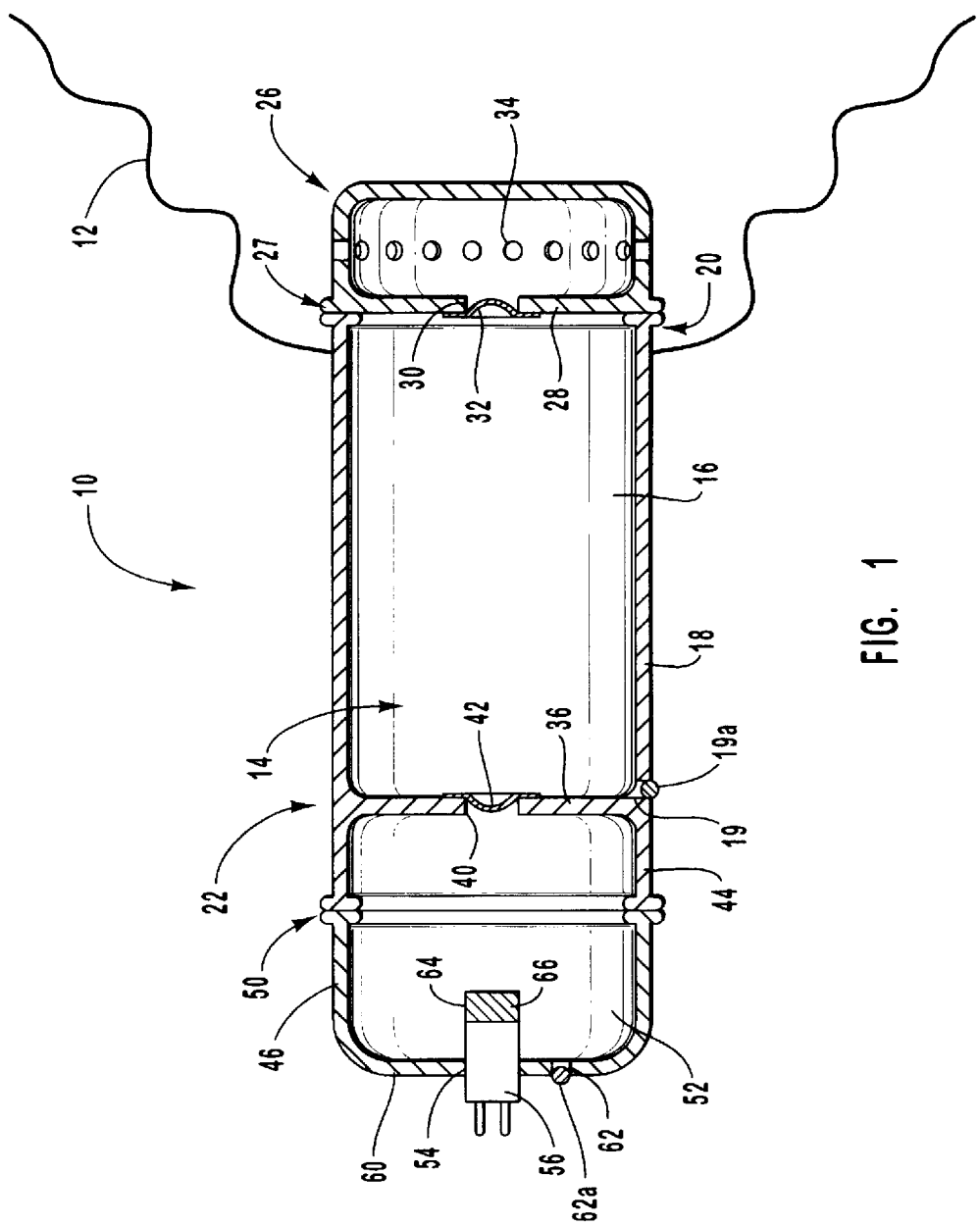
FIG. 1 is a simplified, partially in section, schematic drawing of an airbag inflator assembly in accordance with one embodiment of the invention.

The present invention may be embodied in a variety of different structures. As representative, FIG. 1 illustrates the present invention as embodied in a vehicle safety apparatus, generally designated by the reference numeral 10. The vehicle occupant safety apparatus 10 includes an inflatable vehicle occupant restraint 12, e.g., an inflatable airbag cushion, and an apparatus, generally designated by the reference numeral 14, for inflating the occupant restraint, commonly referred to as an inflator.

Upon proper actuation of the vehicle safety apparatus 10, the vehicle occupant restraint 12 is inflated by a flow of an inflation fluid, e.g., gas, from the inflator 14 to restrain movement of an occupant of the vehicle. The inflatable vehicle occupant restraint 12 is inflated into a location within the vehicle between the occupant and certain parts of the vehicle interior, such as the doors, steering wheel, instrument panel or the like, so that the occupant does not forcibly strike such parts of the vehicle interior.

As will be described in greater detail below, the inflator assembly 14 generates inflation gas via a decomposing material or, more specifically, a dissociative material. Further, while the invention is described hereinafter with particular reference to an inflator for side impact airbag assemblies in various automotive vehicles including vans, pick-up trucks, and particularly automobiles, it is to be understood that the invention also has applicability not only with other types or kinds of airbag module assemblies for automotive vehicles including driver side and passenger side airbag module assemblies, but also with other types of vehicles including, for example, airplanes.

The inflator assembly 14 comprises a chamber 16 that is filled and pressurized with one or more inert gases such as argon or nitrogen, preferably mixed with gaseous helium to facilitate leak checking of the chamber such as in a manner well known in the art. The chamber 16 is sometimes referred to herein as a "gas storage chamber." In practice, such a chamber is typically filled to a pressure in the range of 2000–5000 psi (13.8–34.5 MPa).

The chamber 16 is defined by an elongated generally cylindrical sleeve 18. The sleeve includes a fill port 19, as is known in the art, wherethrough materials can be passed into the chamber 16. After the gas storage chamber 16 has been filled, the fill port 19 can be appropriately blocked or plugged, as is known, such as by a pin or ball 19*a*.

The sleeve 18 has a first end 20 and a second end 22. The first end 20 is closed by a diffuser assembly 26 joined or attached thereto in an appropriate manner, such as by an inertial weld 27. The diffuser assembly 26 includes a rupturable base wall 28. In the illustrated embodiment, the rupturable base wall 28 includes an opening 30 normally closed by means of a burst disc 32 or the like. It will be appreciated that other forms of a rupturable wall such as a wall having an appropriately scored surface or thinned region, for example, can, if desired, be used. The diffuser assembly 26 also includes a plurality of openings 34, wherethrough the inflation gas from the inflator assembly 14 is properly dispensed into the occupant restraint 12. Thus, the diffuser assembly 26 can serve to facilitate direction of the inflation fluid from the inflator assembly 14 into the associated inflatable vehicle occupant restraint 12.

The sleeve second end 22 is partially closed by a rupturable end wall 36. As with the rupturable base wall 28 described above, the rupturable end wall 36 in the illustrated embodiment includes an opening 40 normally closed by means of a burst disc 42 or the like. It will also be appreciated that other forms of a rupturable wall such as a wall having an appropriately scored surface or thinned region, for example, can, if desired, be used.

The sleeve second end 22 includes a collar portion 44. A chamber base portion 46 is joined or attached to the sleeve collar portion 44 in an appropriate manner, such as by an inertial weld 50, to form a chamber 52. The chamber 52 contains, as described in greater detail below, at least one gas source material which undergoes decomposition to form decomposition products including at least one gaseous decomposition product used to inflate the vehicle occupant restraint 12. Thus, the chamber 52 is sometimes referred to herein as a "decomposition chamber."

The base portion 46 includes an opening 54 therein, wherethrough an initiator device 56 is attached in sealing relation, such as with a weld, crimping or other suitable hermetic seal, within the decomposition chamber 52.

In such an assembly, the initiator device can include any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of a pyrotechnic charge. In practice, however, a relatively large heat input such as from the initiator, may be helpful in obtaining a more thorough initiation of the decomposition of various gas source materials, such as nitrous oxide ($N_2O$). In view thereof, as pyrotechnic charge-containing initiators can typically more easily produce such relatively large heat inputs from a relatively small sized initiator device, the practice of the invention with such initiators can be particularly advantageous.

One of the collar portion 44 and the decomposition chamber base portion 46, in the illustrated embodiment the base portion 46 in a base wall 60 thereof, includes a fill port 62, as is known in the art, wherethrough materials can be passed into the decomposition chamber 52. After the decomposition chamber 52 has been filled, the fill port 62 can be appropriately blocked or plugged, as is known, such as by a pin or ball 62*a*.

As identified above, the decomposition chamber 52 contains at least one gas source material which undergoes exothermic decomposition to form decomposition products including at least one gaseous decomposition product used to inflate the associated airbag device. A wide variety of gas source materials which undergo decomposition to form gaseous products are available and are specifically discussed in the above-identified related pending prior application U.S. Ser. No. 08/632,698. Such gas source materials include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

The decomposable gas source materials used in the practice of the invention are preferably:

a.) non-toxic and non-corrosive both in the pre- and post-decomposition states;

b.) do not require the presence of catalyst(s) to trigger the decomposition reaction, and which catalysts may undesirably be difficult to remove or handle, temperature dependent or specific, etc.; and c.) form products of decomposition which do not contain undesirable levels of undesirable species, such as carbonaceous material (e.g., soot), $CO$, $NO$, $NO_2$, $NH_3$, for example.

In view of various manufacture, storage, and handling concerns, a preferred decomposable gas source material for use in the practice of the subject invention, at this time, is believed to be nitrous oxide ($N_2O$).

In accordance with the chemical reaction (1) identified below, upon the decomposition of nitrous oxide, the decomposition products ideally are nitrogen and oxygen:

$$2N_2O = 2N_2 + O_2 \tag{1}$$

Nitrous oxide is a now preferred decomposable gas source material as, in practice, nitrous oxide is generally non-toxic and non-corrosive. Additionally, nitrous oxide is relatively inert up to temperatures of about 200° C. or more. As a result, nitrous oxide is desirably relatively available, safe to handle, thermally stable, facilitates storage, and alleviates manufacturing concerns.

It is to be understood that the decomposable gas source material can, for example and as desired, be stored in a gaseous, liquid or multi-phase form (i.e., partially gaseous and partially liquid mixture). While storage of gas source materials in a liquid form can advantageously reduce the storage volume required and hence the size, weight and typically the costs associated with such assemblies, the need for the inclusion of gaseous helium to facilitate leak checking of the inflator apparatus or, more specifically, of the decomposition chamber thereof will commonly result in the $N_2O/He$ being stored within the decomposition chamber in a completely or predominately gaseous phase.

It should be understood that a number of different factors, either alone or in combination, may dictate the need or desire to store the $N_2O/He$ in the gaseous or predominately liquid phase. One potential problem associated with the use of liquefied materials in pressurized inflation systems is the possibility that the liquid material may inhibit, block or "mask" a leak path. As will be appreciated by those skilled in the art, a "masked" leak is a phenomena by which one or more liquid molecules, through its larger size, increased surface tension or other properties, may temporarily inhibit the passage of a lighter, smaller and generally more mobile molecule (such as of helium leak trace material) through the same leak path. Thus, as will generally be appreciated, the occurrence of such a phenomena could lead to erroneous or mistaken conclusions regarding the leak rate from a particular pressurized fluid-containing device. The storage of the pressurized fluid in a gaseous phase can eliminate such a concern.

In addition, when one or more of the fluid materials are stored in a liquid phase, there may be increased concerns regarding the possibility of corrosion of fluid-contacting interior surfaces of the device. Thus, if liquid phase storage is of concern, the storage of the materials in the gaseous phase could reduce or minimize such concerns.

Thus, in one preferred embodiment of the invention, the materials are stored in a gaseous phase to alleviate such concerns. It will be appreciated, however, that the invention, in its broader application, is not so limited and thus also encompasses storage of the decomposable gas source material also in liquid or multi-phase forms.

Alternatively or in addition, an inert gas, such as argon and helium, for example, or mixture of such inert gases, can be included to supplement the gas produced or formed upon the decomposition of the decomposable gas source material.

In addition, the decomposition chamber 52 contains an optional storage volume 64 which contains a decomposition sensitizer material, generally designated by the reference numeral 66, to promote or accelerate the rate and extent of completion of the decomposition reaction. As disclosed in the above-identified related pending prior application U.S. Ser. No. 08/632,698, filed on Apr. 15, 1996, such sensitizer materials include selected hydrogen-bearing materials added to a decomposable gas source material in small amounts. Specifically, the sensitizer material is preferably added to the decomposable gas source material in an amount below the flammability limits for the content mix, such that the contents of the decomposition chamber are preferably at an equivalence ratio of less than 0.25. At such low relative amounts, the chamber contents are essentially nonflammable and thus ignition and combustion of possible reactants are practically avoided.

Sensitizer materials, also referred to as "sensitizers," are generally defined as additional materials, present in relatively very small amounts, that increase both the rate and the extent (or degree) of completion of the dissociative or decompositional reaction. As such, sensitizers are essentially supplemental heat sources. In their role as a supplemental heat source, a sensitizer may take various forms. In general, a sensitizers can be fully-oxidized (e.g., does not require participation of the surrounding media for its combustion) or under-oxidized (e.g., requires the participation of an additional oxidant, such as from the surrounding media, for its combustion). Commonly preferred fully-oxidized sensitizers include: zirconium potassium perchlorate (ZPP) and boron potassium nitrate ($BKNO_3$). Preferred under-oxidized sensitizers can include: metals, such as magnesium (Mg), aluminum (Al) and zirconium (Zr), either alone or in combinations; ethyl cellulose ($C_{24}H_{46}O_{11}$) or other solid hydrocarbons; ethyl alcohol ($C_2H_6O$) or other liquid hydrocarbons; gaseous hydrogen ($H_2$) or hydrocarbons such as butane ($C_4H_{10}$). Thus, sensitizers used in the practice of the invention can take the form of a gas, liquid or solid, as well as various multi-phase combinations thereof.

Further, the sensitizer utilized in the practice of the invention can, if desired, include a mixture of one or more fully-oxidized material with one or more under-oxidized material, such as those described above. One preferred such mixture for use in the practice of the invention is a mixture of $BKNO_3$ with magnesium.

One such an inflator assembly for use in association with a side impact airbag cushion has a typical size of: diameter= 25 mm, length=150 mm and loaded to contain within:

the gas storage chamber 16 = 10 grams of a mixture containing 90 vol. % Ar and 10 vol.% He and stored at 4000 psi (27.6 Mpa) in volume of 1.5 in³ (24.6 cc)

the decomposition chamber 52 = 2.2 grams of a mixture containing 60 vol. % $N_2O$ and 40 vol.% He and stored ats 2100 psi (14.5 MPa) in a volume of 0.65 in³ (10.7 cc)

The so described inflator assembly 14 is generally the same or similar to inflator assemblies described in the above-referenced U.S. Ser. No. 08/632,698, filed on Apr. 15, 1996. The inflator assembly 14, however, differs from those described in that prior application in that the decomposition chamber 52 additionally contains at least one radioactive isotope leak trace material whereby fluid leakage from the decomposition chamber can be detected.

Various radioactive leak trace materials can be used. The radioactive isotope $Kr^{85}$ has found previous extensive use as a leak trace material. As a result, a vast quantity of commercial and practical experience has been accumulated in connection regarding such use of the radioactive isotope $Kr^{85}$. In view of such previous uses and experience, the radioactive isotope $Kr^{85}$ is believed to be a preferred leak trace material for use in the practice of the invention.

It will be appreciated that one or more various techniques or methods can be employed for the incorporation of the at least one radioactive isotope leak trace material within the decomposition chamber 52. For example, the leak trace material can, if desired, simply be dispersed with the balance of the chamber contents, e.g., the gas source material and, if used, inert gas. Alternatively or in addition, leak trace material can be held or contained by a solid material within the decomposition chamber 52. In one preferred form of the invention, the solid material which holds the radioactive leak trace material also serves to sensitize the gas source material, e.g., nitrous oxide. Such a radioactive leak trace material holding solid can be simply placed within the specified chamber or, if desired, in embodiments wherein the initiator device discharges into the specified chamber, be contained within the initiator device or placed adjacent the discharge end of the initiator device such as in a storage volume located thereat.

As discussed below, several methods of leak detection utilizing a radioactive tracer in accordance with the invention are envisioned. As also described below, the amount or quantity of the radioactive isotope required to be added to a particular vessel being tested can be correspondingly determined.

METHOD 1

In this method, a specified quantity of the selected radioactive isotope is directly loaded into the inflator pressure vessel being leak checked. After a selected period of time has elapsed, the vessel is checked for radioactive material content by measuring the gamma ray signal external to the component and, if desired, such as in order to determine if there is a direct leak of gas from the vessel, by a measurement of beta particle output. The measured gamma ray signal is then related to the content of stored pressurized fluid in the vessel. The initial and remaining quantities or contents of the radioactive material can then be compared against a predefined limit whereby the acceptability of the leak rate of the vessel can be assessed.

With this method, it is to be understood that the elapsed period of time will generally be defined to be relatively short, as compared to the intended useful life of the inflator. For example, the useful life of an inflator is normally intended to be about 15 years or more, while the elapsed time between the initial and final determinations of the quantity of radioactive material within the vessel is generally on the order of no more than a few days, preferably no more than a few hours and, more preferably, no more than a few minutes.

Gamma ray

Gamma ray readings correspond to the amount of radioactive material present. Where the elapsed time between the initial and subsequent checks for radioactive content is sufficiently short that the effects of radioactive decay can be neglected, a reduction in the gamma ray reading between the initial and subsequent check indicates a reduced amount of radioactive material present in the tested component, i.e., the existence of a leak.

Beta particle

Discounting contamination of the component being tested, an increased beta particle reading from a component initially providing a zero beta particle reading would indicate the development of a leak path, while an increased beta particle reading from an initially non-zero beta component would indicate that the component has an increased leak rate.

While beta particle readings are not necessarily required in order to make METHOD 1 viable, beta particle detection could provide additional desired information regarding the leaking from a pressure vessel. In particular, beta particle readings can be used in conjunction with gamma ray readings to provide some clues as to the nature of the leak situation of a pressure vessel.

For example, take a vessel containing a known amount (such as through gamma ray readings) of radioactive material and for which vessel the presence of a small leak has been detected (through beta particle readings). At some later point in time further gamma ray and beta particle readings from the vessel are made. The later detection of gamma ray emission indicates that radioactive material remains in the vessel. However, if at that later point in time no beta particles are detected, the absence of beta particles would indicate that the leak path of beta particle out of the inflator has been closed. The potential openings and closing of leak paths is an area of concern in leak studies and is generally not well understood.

Those skilled in the art will appreciate that beta particles can be relatively easily shielded or even completely attenuated by even very thin, non-dense materials (such as a piece of paper, for example). Thus, a beta particle detection is indicative of a gas escaping directly from a device or component. On the other hand, gamma rays can generally penetrate even much more dense materials.

The utilization of beta particle detection as a part of a leak detection system is, however, subject to certain limitations or complications. For example, beta particle detection may be difficult to accomplish in a practical manner in a manufacturing environment due to the desirability of subjecting the entire surface of the component to beta particle emission detection. In addition, the detection of smaller leaks will generally require the use of beta detection instrumentation of enhanced sensitivity. Further, the potential for spurious signals in beta particle detection may need to be considered or compensated for. For example, greases, oils and other hydrocarbon contaminants can be effective in absorbing a radioactive tracer such as $Kr^{85}$ gas. These contaminants may, at some later point in time, undesirably evolve the tracer gas.

Thus, in order to avoid a false indication of a direct gas leak, components are desirably free of such potential surface contaminants or component surfaces having such contaminants are not exposed to the radioactive tracer during processing. Also, components fabricated of plastic or other materials having porous surfaces may absorb a radioactive tracer such as $Kr^{85}$ gas. Consequently, steps must generally be taken to ensure that tested component only contains such a radioactive tracer in the proper cavities and locations.

The specific steps required to develop and institute a method by which the quantity of a radioactive tracer required to fill and accurately leak check a pressure vessel, in accordance with this method, are:

1) Measure the amount of radioactive attenuation by (through) the walls of the vessel. This is can be done by placing a known amount of radioactive material in a test vessel, identical in construction to the vessel to be manufactured, and then directly measuring the amount of radioactivity external to the vessel. The difference between the internal and external radioactivity measurements represents the amount of radioactivity absorbed by the vessel. Consequently, the amount of radioactive material loaded into the inflator vessel to be tested must correspond to an amount greater than this attenuation amount in order to permit its measurement.

2) Establish the maximum permissible amount of gas that can be lost from the inflator vessel (such as through a leak) for the expected useful life of the vessel. The amount of gas leakage which would be permissible can be established through a series of tests performed using similarly constructed inflators but which inflators have stored therein progressively lesser quantities of gas. These inflators are tested for performance in accordance with an appropriate established criteria, such as including deployment pressure into a known volume, i.e., a tank test, to establish the minimum amount of stored gas within the inflator necessary for proper functioning of the inflator and, in turn, the amount of gas which can be lost and the inflator still function properly.

3) Determine the maximum rate of allowable loss of the stored fluid (e.g., gas) over the lifetime of the inflator. As will be appreciated by those skilled in the art, this rate of loss can be determined through the use of various mathematical models, including, for example, viscous, molecular, kinetic and transitional models. While a detailed discussion of these models is beyond the scope of this document, some of the more significant aspects of each of these models are discussed below:

Viscous Model—Viscous flow occurs when the mean free path length of the gas is much smaller than the cross-sectional dimension of a physical leak path. This model generally assumes that both the stored gas mixture and the tracer gas escape in proportion to their respective viscosities. At the very high pressures and low leak rate regimes typical for such inflators, the viscous flow model is often considered a generally conservative model, i.e., it generally predicts the largest gas mass loss.

Molecular Model—This model generally assumes that the stored gas and tracer gas will escape in proportion to their respective molecular weights, e.g., lighter molecules will escape more quickly. The molecular model is often not used for stored gas inflators since this model is generally not as conservative as the viscous model.

Transitional Model—This model combines certain aspects of the viscous and molecular models. Care is generally required in its use as various assumptions made in its mathematical derivation can make this model either more or less conservative than the viscous and molecular models.

Kinetic Model—In this model, the flow rate of gas from the vessel is described using kinetic theory. Although the kinetic theory is well developed, various restricting assumptions regarding the state and properties of the particular gases under study are often required in order for the model to be implemented.

It will be appreciated that none of these models alone may accurately described the physics associated with a particular leak phenomena.

4) Relate the maximum allowable leak rate of stored fluid mixture to the maximum allowable leak rate of the radioactive tracer material. From this determination, the initial maximum quantity of the radioactive tracer material required in the vessel can be estimated. It should be understood, and will be appreciated by those skilled in the art, that the quantity of radioactive tracer material could be reduced through measurement of the detectability of this quantity of material in the actual vessel.

In Method 1, it will generally be desirable to minimize the quantity of radioactive tracer material, while maintaining the ability to properly leak check the vessel to the magnitude necessary in the required time interval.

For example, assuming an inflator is initially filled with $R_1$ curies of radioactive material and that the maximum gas leak rate of radioactive gas from the inflator over a selected period of time corresponds to $R_2$ curies of radioactive material, then the amount of radioactivity remaining in the inflator after the selected period of time ($R_3$) will generally relate as follows: $R_3 = R_1 - R_2$. As a result, the radioactive isotope detector should be capable, at least, of delineating between $R_1$ and $R_3$ quantities of radioactivity.

This also points out why the attenuation measurement in step 1) is important as an $R_3$ reading less than the amount of radiation attenuation by the vessel walls would be generally undetectable.

5) A known amount of the radioactive tracer, as determined through the above steps, is placed within the vessel at generally atmospheric pressure. The vessel is subsequently filled with the desired high pressure gas. The vessel can then be checked for gamma rays and, if desired, beta particles, as described above.

METHOD 2

This method is generally similar to the above method 1 except that there is no need for an initial radioactivity reading.

Assuming that an inflator vessel can be filled with a known amount of radioactive material in a repeatable manner, the following procedure can be utilized:

The inflator is filled as in method 1. The inflator is then set aside for a predetermined period of time, the amount of time determined as described above in method 1. After which, a leak check involving a gamma ray reading or both, a beta ray and a gamma ray reading, as described above, is performed.

METHOD 3

As discussed above, a major advantage to the use of a radioactive tracer gas in the leak detection of a pressure vessel is that the amount of radioactive material remaining in the vessel can be relatively easily and accurately checked at subsequent points in time. In contrast, with helium-based leak detection systems common in industry, the amount of helium remaining within a vessel at some later point in time, though assumed, is generally not accurately known. Method 3 makes use of the characteristics of the radioactive tracer material in order to solve certain deficiencies of common helium-based leak detection systems.

This method is generally similar to that of Method 1, described above, with the additional provision of a quantity of the radioactive tracer material to allow for the radioactive decay of the radioactive tracer over the vessel component lifetime, e.g., 15 years.

In a basic form, this method can be stated as follows: the pressure vessel is filled with a quantity of radioactive tracer material such that, for the expected lifetime of the device (given a specified maximum leak rate of gas therefrom), a sufficient quantity of the radioactive material remains that the quantity of the radioactive material within the vessel and rate of leakage of the radioactive material from the vessel can be measured.

In general, in order to make this method a viable option in standard practice, the following information is desired: the attenuation of the radiation by the vessel walls, the rate at which the tracer material undergoes radioactive decay, the maximum amount of allowable leakage from the vessel and the effects of dispersion of the radioactive material into the surroundings.

With respect to the filling of a particular vessel, it will generally be appreciated that if the pressure within the vessel is generally atmospheric or less, the vessel can simply be filled with the amount of the radioactive tracer determined above and temporarily sealed, such as with foil or tape to prevent escape of tracer materials, prior to being filled with the desired high pressure fluid.

If, the required amount of the radioactive tracer material is such as to result in a pressure greater than atmospheric pressure, special processing steps or procedures may be required. For example, the radioactive tracer material can be added or mixed directly with the high pressure fluid, e.g., gas or gas mixture, such as $N_2O$ or $N_2O/Ar$, which is to fill the vessel. Alternatively, the radioactive tracer material can be absorbed on a solid, such as described herein, and appropriately added to the vessel.

The so filled vessels can then be checked for gamma rays and, if desired, beta particles, as described above.

It will be appreciated that these methods may be subject to certain established or prescribed limitations. Such limitations may include one or more of the following:

1) That individual inflators do not contain radioactive material in harmful amounts;
2) The radiation release associated with the release or escape of all or a portion of the stored fluid is not harmful; and
3) The additive radiation effects of such an inflator is not harmful such as when, for example, a plurality of such inflators are concentrated in a relatively small area.

In the conventional leak check technique using helium tracer, the amount of helium remaining in the vessel at some later point in time may not be accurately known, dependent upon the type of leak (e.g., molecular, kinetic or viscous) from the vessel.

Method 3 represents a possible improvement over such a conventional technique if direct determination of vessel contents is required, given the passing of a relatively long period of time since the vessel was initially filled. For example, using Method 3, a particular component could be withdrawn from service at a selected point in time during the course of its lifetime (which for an airbag inflator is, as identified above, generally considered to be 15 years) and checked for the presence of radioactive material.

More specifically, the radioactive (gamma ray) signal emanating from the vessel can be monitored. Assuming the use of $Kr^{85}$ gas as the radioactive tracer material, the pressure of the contents of the vessel can then be calculated in general accordance with the following equation:

$$P_{final} = P_{initial} e^{-kt} \qquad (2)$$

where:

$P_{final}$=partial pressure of $Kr^{85}$ in the vessel after time "t"
$P_{initial}$=initial partial pressure of $Kr^{85}$ in the vessel
k=leak rate from the vessel
t=elapsed time The amount of $Kr^{85}$ remaining in the vessel can then be calculated using any appropriate equation of state for the gaseous mixture. Those skilled in the art will understand and appreciate that in making this calculation radioactive decay of the radioactive isotope can be accounted for using the following exponential relationship which governs the rate of radioactive decay:

$$A_t = A_o e^{-(0.693 t/T)} \qquad (3)$$

where:

$A_t$=amount of $Kr^{85}$ remaining at time "t"
$A_o$=original amount of $Kr^{85}$ at time "0"
"t"=time passed, in years
T=half-life of $Kr^{85}$=10.76 years This ability to accurately check the leak rate from a device after the passage of a significant period of time subsequent to manufacture is a significant benefit of the subject invention.

The normal operation of the vehicle occupant safety apparatus 10 is as follows:

Upon the sensing of a collision, an electrical signal is sent to the initiator device 56. The initiator device 56 functions and, when it is a pyrotechnic charge-containing initiator, discharges high temperature combustion products into the decomposition chamber 52 and the contents thereof, which in one embodiment includes gaseous phase $N_2O$. The large heat addition results in commencement of the thermal decomposition of the $N_2O$. In this thermal decomposition, the $N_2O$ begins to break down into smaller molecular fragments. As the $N_2O$ molecules fragment, the associated release of energy results in further heating of the remaining mixture. The increase both in temperature and the relative amount of gaseous products within the decomposition chamber 52 results in a rapid pressure rise in the decomposition chamber.

When the gas pressure within the decomposition chamber 52 exceeds the structural capability of the burst disc 42, the disc 42 ruptures or otherwise permits the passage of the hot decomposition products into the gas storage chamber 16. Wherein, the hot decomposition gas expelled from the decomposition chamber 52 mixes with the pressurized gas stored within the gas storage chamber 16 to produce inflation gas for use in inflating the inflatable restraint device 12. It will be appreciated that augmenting the decomposition product gas with the stored inert gas, in addition to diluting the products of decomposition, may also serve to produce an inflation gas having a lower temperature than the decomposition gas alone.

When the gas pressure within the storage chamber 16 exceeds the structural capability of the burst disc 32, the disc 32 ruptures or otherwise permits the passage of the inflation gas through the diffuser assembly 26 and out the diffuser outlet openings 34 into the inflatable vehicle occupant restraint 12.

Figure 2:
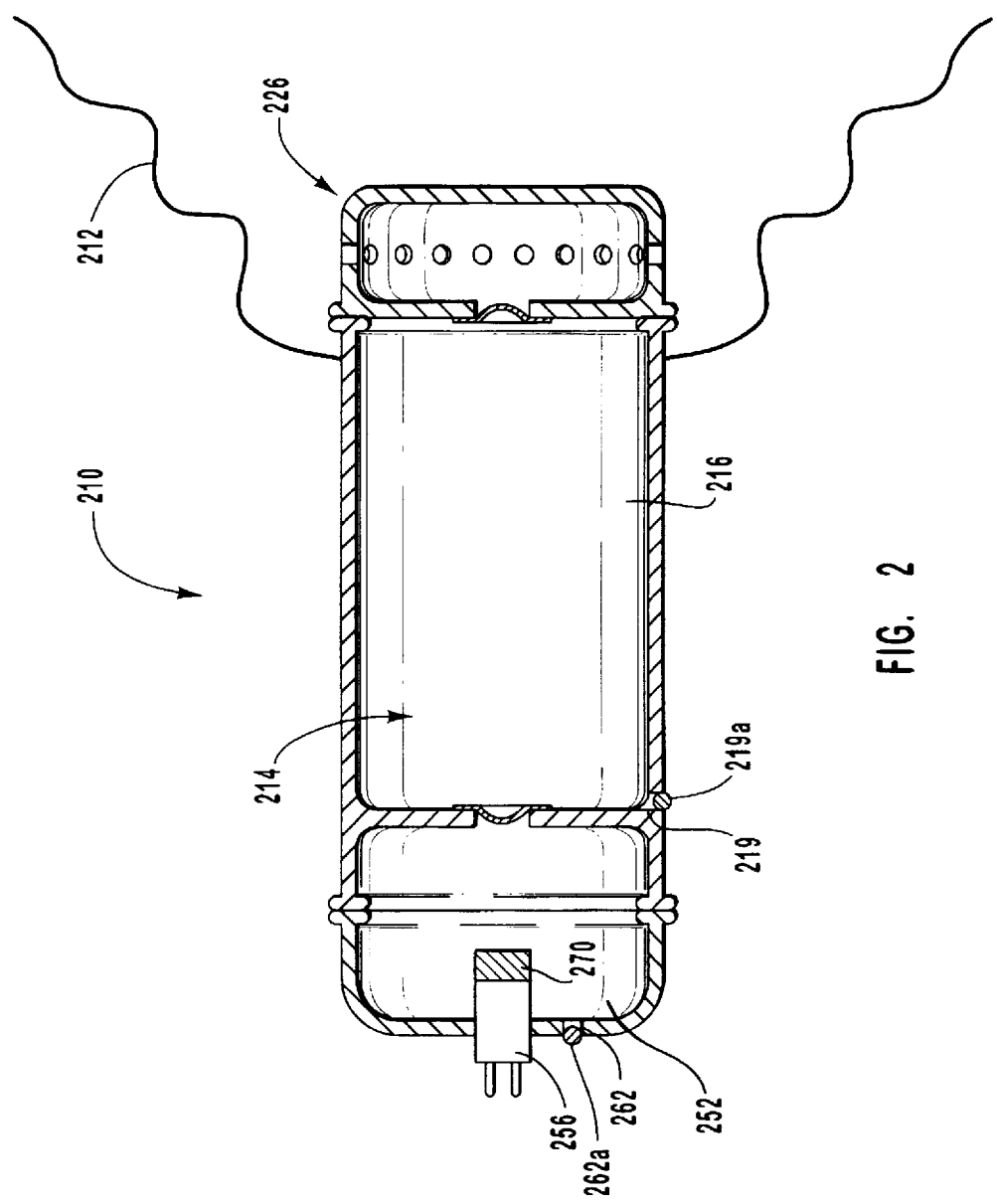
FIG. 2 is a simplified, partially in section, schematic drawing of an airbag inflator assembly in accordance with an alternative embodiment of the invention.

FIG. 2 illustrates a vehicle safety apparatus, generally designated by the reference numeral 210, in accordance with an alternative embodiment of the invention. The vehicle safety apparatus 210 is generally similar to the vehicle safety apparatus 10, described above, and includes an inflatable vehicle occupant restraint 212 and an inflator assembly 214. The inflator assembly 214 comprises a gas storage chamber 216, a diffuser assembly 226, a decomposition chamber 252, and an initiator device 256.

As in the above-described embodiment, the gas storage chamber 216 is filled and pressurized, typically to a pressure in the range of 2000–5000 psi (13.8–34.5 MPa), with one or more inert gases such as argon or nitrogen, preferably mixed with gaseous helium to facilitate leak checking of the chamber. To that end, the apparatus 210 includes a fill port 219, as identified above, wherethrough materials can be passed into the gas storage chamber 216. As with the embodiment of FIG. 1, after the gas storage chamber 216 has been filled, the fill port 219 can be appropriately blocked or plugged, such as by a pin or ball 219a.

Also, as in the above-described embodiment, the decomposition chamber 252 contains at least one gas source material which undergoes decomposition to form decomposition products including at least one gaseous decomposition product used to inflate the vehicle occupant restraint 212. The decomposition chamber 252 also contains at least one radioactive isotope leak trace material, such as the radioactive isotope $Kr^{85}$, whereby fluid leakage from the decomposition chamber can be detected, as described above. To that end, the apparatus 210 includes a fill port 262, as identified above, wherethrough materials can be passed into the decomposition chamber 252. As with the embodiment of FIG. 1, after the decomposition chamber 252 has been filled, the fill port 262 can be appropriately blocked or plugged, such as by a pin or ball 262a.

The inflator assembly 214, however, does not rely on the inclusion of gaseous helium within the decomposition chamber 252 for purposes of leak detection and monitoring. As a result of not including gaseous helium within the decomposition chamber 252, the at least one gas source material stored therewithin can be preferably stored in a supercritical fluid or predominately liquid phase. As will be appreciated, storage of the gas source material in a supercritical fluid or predominately liquid phase permits the storage of a greater amount of material in the same volume. As a result, the decomposition chamber 252 is physically smaller than the decomposition chamber 52 in the above-described embodiment. In general terms, this reduction in volume will generally correspond on the order of the volume otherwise occupied by gaseous helium. Thus, assuming constant pressure and ideal gas behavior, a reduction in volume of nearly 40 percent or more is possible.

It will be appreciated that reductions in the size of the decomposition chamber will typically have associated therewith a corresponding reduction in weight. As described above, reductions in weight are typically much sought after in modern vehicular design.

The leak trace material can be held mixed with the liquid contents of the decomposition chamber 252 or, as shown, be held by a solid material 270 within the decomposition chamber 252. Such solid material initially holds at least a substantial portion of the radioactive isotope leak trace material contained within the decomposition chamber 252. It will be appreciated, that over time, a large percentage of the leak trace material originally absorbed or held by or in the solid material 270 will be gradually released or no longer held thereby and thus permit or allow the detection of the presence of leaks, as described above.

Such a solid material which initially holds at least a substantial portion of the radioactive isotope leak trace material can be of various composition. For example, many decomposition sensitizer materials can also advantageously serve as such a radioactive isotope leak trace material-holding solid, also commonly referred to as a "getter."

As discussed above, sensitizer materials include selected hydrogen-bearing materials. In general, many if not most carbon-bearing materials have been found to excellent adsorbers or "holders" of radioactive isotope leak trace materials, such as $Kr^{85}$. Thus, hydrocarbon-bearing sensitizers such as ethyl cellulose, ethyl alcohol, butane, etc. can also serve to hold or contain radioactive isotope leak trace materials such as $Kr^{85}$. It will be appreciated that hydrocarbon-bearing materials constituting such a sensitizer and radioactive isotope leak trace material holder used in the practice of the invention can take various forms, as desired, and can thus include the form of a solid, liquid or multiphase combinations thereof.

In addition, non-hydrocarbon materials such as boron potassium nitrate ($BKNO_3$) and zirconium potassium perchlorate (ZPP) as well as metal and metal powders such as of magnesium, and composite formulations of these components can be pressed or shaped in the form of porous plugs or other suitable forms or matrixes, such that the radioactive isotope leak trace material, such as $Kr^{85}$, can be driven and initially held in internal cavities of such material forms.

In general, from a manufacturing and handling standpoint, it is considered advantageous to utilize a solid material as a getter. More specifically, such a solid getter material, onto or into which $Kr^{85}$ has been adsorbed, can be easily loaded into an inflator apparatus. To minimize undesired $Kr^{85}$ escape, efforts can be taken to minimize the amount of time that a $Kr^{85}$-loaded getter remains outside of the sealed inflator apparatus.

The normal operation of the vehicle occupant safety apparatus 210 is generally similar to the vehicle occupant safety apparatus 10, described above, and is generally as follows:

Upon the sensing of a collision, an electrical signal is sent to the initiator device 256. The initiator device 256 functions and, when it is a pyrotechnic charge-containing initiator, discharges high temperature combustion products into the decomposition chamber 252 and the contents thereof, which in one embodiment includes gaseous phase $N_2O$. The large heat addition results in commencement of the thermal decomposition of the $N_2O$. In this thermal decomposition, the $N_2O$ begins to break down into smaller molecular fragments. As the $N_2O$ molecules fragment, the associated release of energy results in further heating of the remaining mixture. The increase both in temperature and the relative amount of gaseous products within the decomposition chamber 252 results in a rapid pressure rise in the decomposition chamber.

When the gas pressure within the decomposition chamber 252 becomes sufficiently high, hot decomposition products are passed into the gas storage chamber 216. Wherein, the hot decomposition gas expelled from the decomposition chamber 252 mixes with the pressurized gas stored within the gas storage chamber 216 to produce inflation gas. When the pressure within the gas storage chamber 216 becomes sufficiently high, the inflation gas is passed through the diffuser assembly 226 into the inflatable vehicle occupant restraint 212.

Figure 3:
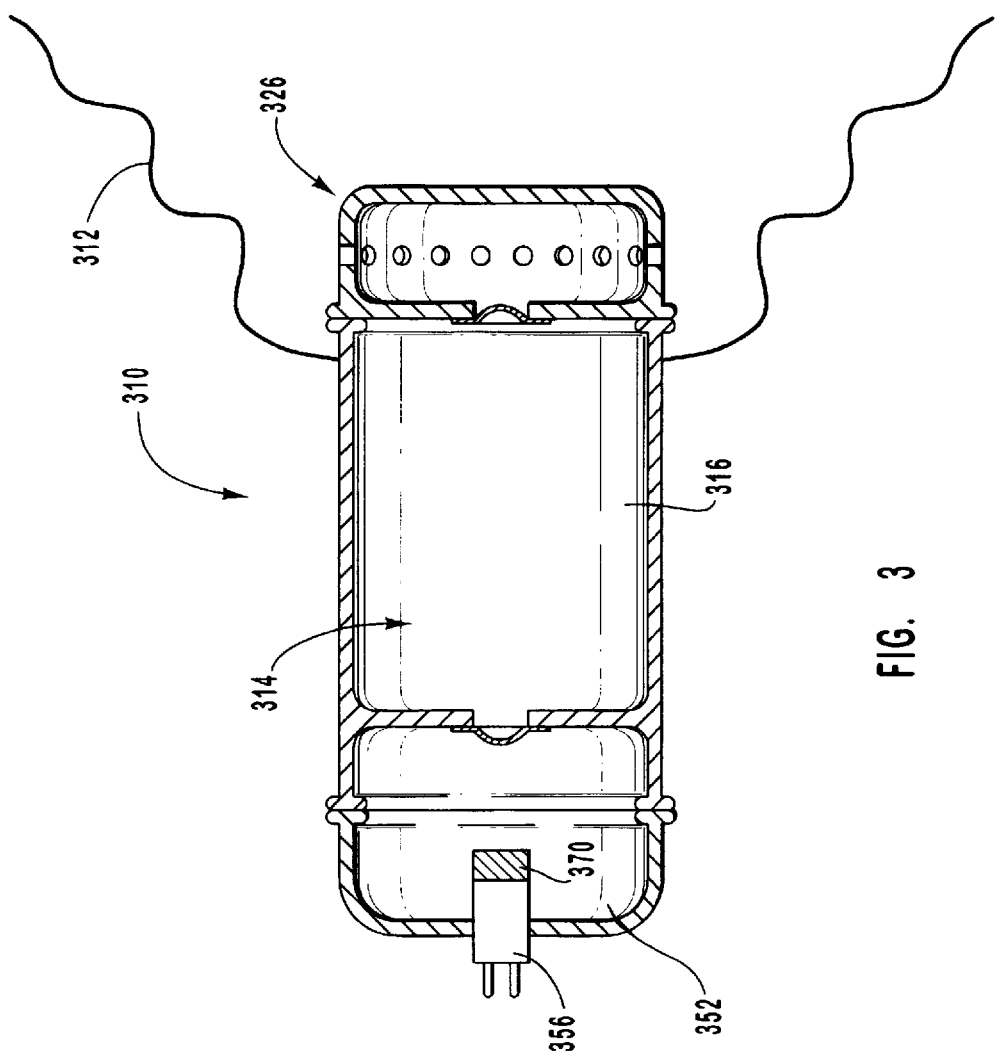
FIG. 3 is a simplified, partially in section, schematic drawing of an airbag inflator assembly in accordance with another alternative embodiment of the invention.

FIG. 3 illustrates a vehicle safety apparatus, generally designated by the reference numeral 310, in accordance with an alternative embodiment of the invention. The vehicle safety apparatus 310 is generally similar to the vehicle safety apparatus 210, described above, and includes an inflatable vehicle occupant restraint 312 and an inflator assembly 314. The inflator assembly 314 comprises a gas storage chamber 316, a diffuser assembly 326, a decomposition chamber 352, and an initiator device 356.

As in the vehicle safety apparatus 210, the gas storage chamber 316 is filled and pressurized, typically to a pressure in the range of 2000–5000 psi (13.8–34.5 MPa), with one or more inert gases such as argon or nitrogen, preferably mixed with gaseous helium to facilitate leak checking of the chamber.

Also, as in the vehicle safety apparatus 210, the decomposition chamber 352 contains at least one gas source material which undergoes decomposition to form decomposition products including at least one gaseous decomposition product used to inflate the vehicle occupant restraint 312. The decomposition chamber 352 also contains at least one radioactive isotope leak trace material, such as the radioactive isotope $Kr^{85}$, whereby fluid leakage from the decomposition chamber can be detected, as described above.

As in the vehicle safety apparatus 210, the inflator assembly 314 does not rely on the inclusion of gaseous helium within the decomposition chamber 352 for purposes of leak detection and monitoring. As a result, storage of the gas source material in the form of a supercritical fluid or a predominately liquid is facilitated. As discussed above, storage in such forms permits the decomposition chamber to generally be desirably physically smaller than required to store the corresponding amount of gas source material in a gaseous form.

As with the vehicle safety apparatus 210, the leak trace material can be held mixed with the liquid contents of the decomposition chamber 352 or, as shown, be held by the solid material 370 within the decomposition chamber 352.

The vehicle safety apparatus 310, however, differs from the above-described apparatus 210 in that, as will be described in greater detail below with particular reference to FIGS. 4A and 4B, the at least one gas source material is placed within the decomposition chamber 352 in a manner that avoids the use of a fluid fill port. As a result and as shown in FIG. 3, the enclosing walls of the decomposition chamber 330, i.e., the wall 336, the collar portion 344 and the base portion 346, are desirably free of fluid fill ports. It will be appreciated that the absence of such fluid fill ports eliminates a major source of leakage from such pressurized fluid-containing devices. The absence of a fill port, however, necessitates the utilization of some other means for filling the decomposition chamber in the practice of this aspect of the invention.

Figure 4B:
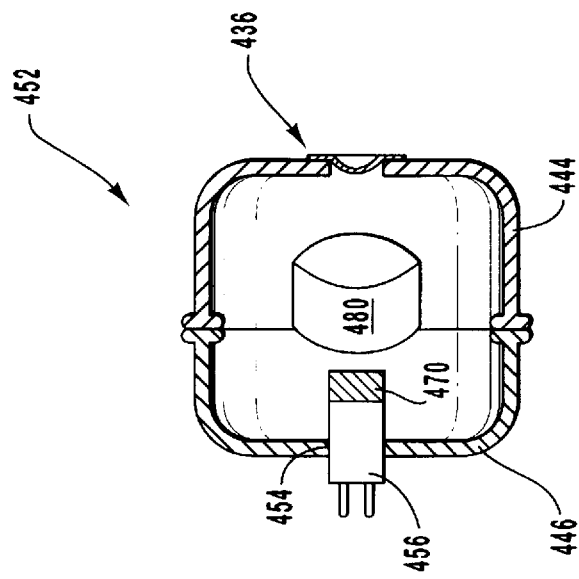
FIGS. 4A and 4B show a decomposition chamber in a preassembled and an assembled form, in accordance with one embodiment of the invention.
Figure 4A:
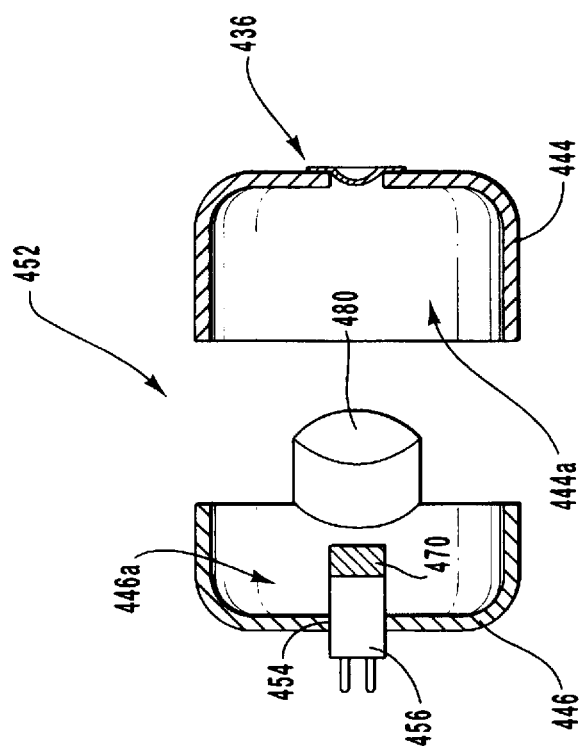

One preferred technique for providing an appropriately filled decomposition chamber is hereafter described with particular reference to FIGS. 4A and 4B.

FIGS. 4A and 4B show the decomposition chamber 452 in a preassembled and assembled form, respectively. As shown, the decomposition chamber 452 comprises a cup-shaped cap portion 444 and a cup-shaped base portion 446. The cap portion 444 forms an interior 444a and includes a rupturable wall 436. The base portion 446 forms an interior 446a and includes an opening 454 wherethrough an initiator device 456 is attached in sealing relation, such as with a weld, crimping or other suitable hermetic seal. Similar to the apparatuses 210 and 310, described above, the leak trace material can be held by a solid material 470 within the decomposition chamber 452.

While the decomposition chamber 452 is in a preassembled form, such as shown in FIG. 4A, an appropriate quantity of cryogenically formed or frozen $N_2O$, e.g., a solid mass designated by the reference numeral 480 and the preparation of which is described in greater detail below, is placed within one of the cap portion or base portion interiors, i.e., 444a or 446a, respectively. The cap portion 444 and the base portion 446 are then appropriately joined and sealed together such as by means of being welded together, as shown in FIG. 4B.

Inertial welding is a preferred welding technique for use in the practice of this aspect of the invention. First, inertial welding is a relatively fast process, thereby avoiding undesired prolonged exposure of the cryogenically formed or frozen $N_2O$ to the elevated temperatures produced during the welding. Further, inertial welding typically provides a form of a means of joining that desirably is relatively robust and not prone to leaks, thereby better ensuring desired containment of the gas source material during the possibly prolonged period of time prior to actuation of an inflator containing such gas source material.

The method or technique of preparing samples of cryogenically formed or frozen nitrous oxide is not an aspect of the subject invention and those skilled in the art will appreciate that various suitable methods or techniques are available. For example, if desired, the cryogenic or frozen quantities of nitrous oxide can be formed by pumping fluid nitrous oxide into a closed mold and then submerging the nitrous oxide-filled mold in a bath of liquid nitrogen, thereby freezing the nitrous oxide.

A factor in the ability to manufacture an inflator using a cryogenically formed or frozen quantity or slug of nitrous oxide is the degree to which or extent of sublimation of nitrous oxide in the ambient environment. Thus, the rate at which solid phase nitrous oxide transforms to gas phase nitrous oxide (given the temperature of the surrounding environment), as well as the period of time between the removal of the cryogenic or frozen nitrous oxide from its storage environment and the placement thereof into an inflator chamber and the sealing of such inflator chamber need be considered. It will be appreciated that the nitrous oxide loss due to sublimation desirably is maintained below the specified nitrous oxide load tolerance as determined by the functionality requirements for the inflator.

Figure 5:
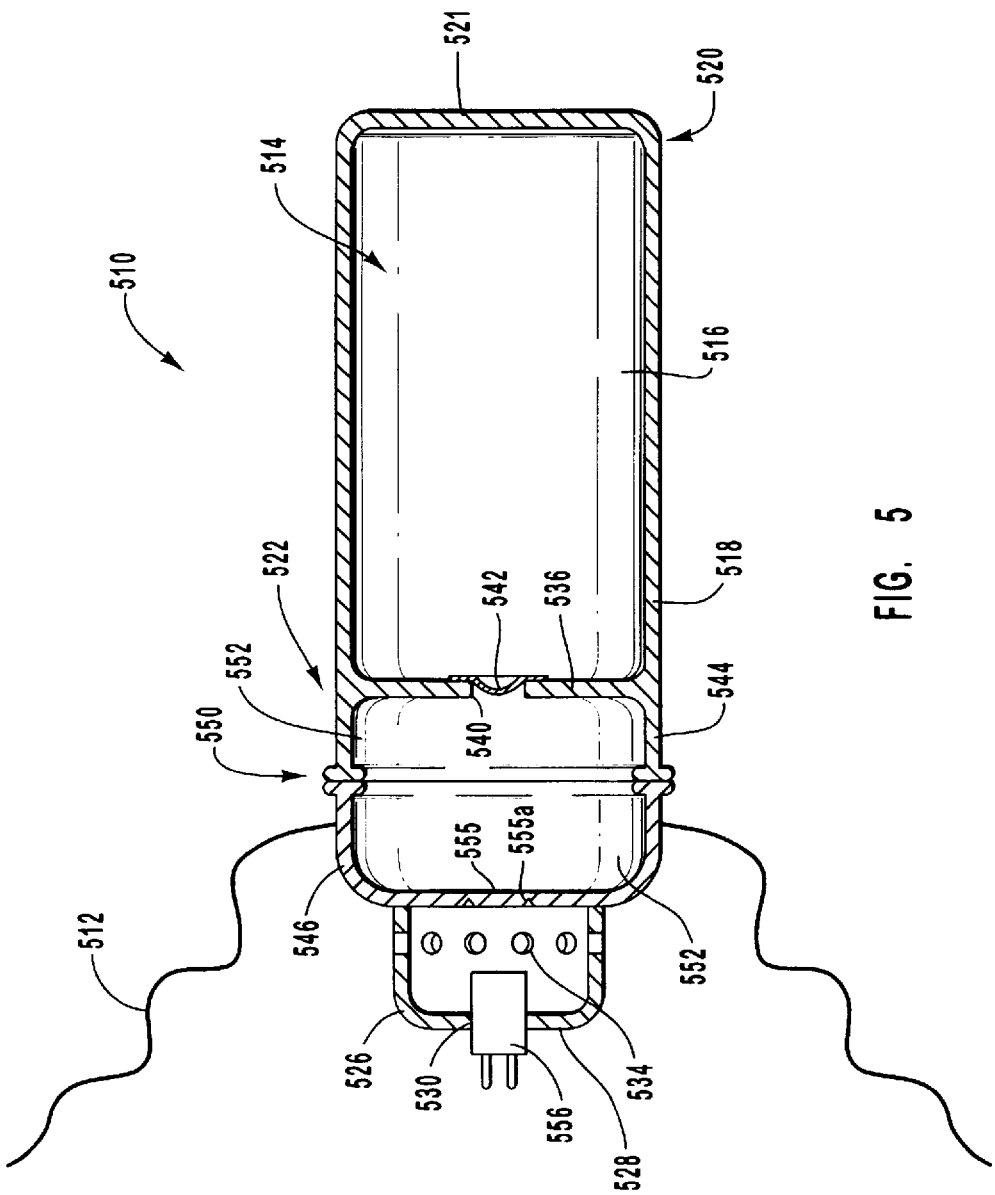
FIG. 5 is a simplified, partially in section, schematic drawing of an airbag inflator assembly in accordance with still another alternative embodiment of the invention.

FIG. 5 illustrates a vehicle occupant safety apparatus, generally designated by the reference numeral 510, in accordance with still another alternative embodiment of the invention. The vehicle safety apparatus 510, similar to the above-vehicle safety apparatus 310, described above, and includes an inflatable vehicle occupant restraint 512 and an inflator assembly 514. The inflator assembly 514 comprises a gas storage chamber 516 and a decomposition chamber 552, similar to those in the above-described inflator assembly 314. As will be described in greater detail below, however, the inflator assembly 514 includes a diffuser assembly 526 and an initiator device 556 of different construction, assembly and operation as both the diffuser assembly 526 and the initiator device are both present at the same end of the inflator assembly 514 and directly physically interact.

More specifically, the gas storage chamber 516 is defined by an elongated generally cylindrical sleeve 518, having a first end 520 and a second end 522. The first end 520 is closed by an end wall 521. The end wall 521 can desirably be integral (i.e., formed continuous with and in one piece) with the sleeve 518. The sleeve second end 522 is closed by a rupturable end wall 536, similar to the rupturable end wall 36, described above. The rupturable end wall 536 includes an opening 540 normally closed by means of a burst disc 542 or the like. It will also be appreciated that other forms of a rupturable wall such as a wall having an appropriately scored surface or thinned region, for example, can, if desired, be used.

The sleeve second end 522 includes a collar portion 544. A chamber base portion 546 is joined or attached to the sleeve collar portion 544 in an appropriate manner, such as by an inertial weld 550, to form the decomposition chamber 552. The decomposition chamber 552 contains, similar to the inflator assembly decomposition chambers described above, at least one gas source material which undergoes decomposition to form decomposition products including at least one gaseous decomposition product used to inflate the vehicle occupant restraint 512.

The base portion 546 includes a preweakened region 555 such as formed by the inclusion of a score 555a or area of reduced thickness to permit the base portion 546 to desirably specifically open in a manner such as described in greater detail below.

The diffuser assembly 526 is joined or attached to the base portion 546, adjacent the preweakened region 555, in an appropriate manner, such as by an inertial weld. The diffuser assembly 526 includes a base wall 528 having an opening 530 therein wherethrough an initiator device 556 is attached in an appropriate manner such as with a weld or by crimping, for example. The diffuser assembly 526 also includes a plurality of openings 534, wherethrough the inflation gas from the inflator assembly 514 is properly dispensed into the occupant restraint 512.

The normal operation of the vehicle occupant safety apparatus 510 is as follows:

Upon the sensing of a collision, an electrical signal is sent to the initiator device 556. The initiator device 556 functions, causing the failure or opening of the preweakened region 546 of the base portion 546 of the decomposition chamber 552 and, when the initiator device 556 is a pyrotechnic-containing initiator, discharge of high temperature combustion products into the decomposition chamber 552 and the contents thereof, which in one embodiment includes gaseous phase $N_2O$.

With the opening of the preweakened region 546, some of the gas stored within the decomposition chamber 552 will pass into the diffuser assembly 526 and out the diffuser outlet openings 534 into the inflatable vehicle occupant restraint 512. Meanwhile, the relatively large heat input from the initiator device 556 results in commencement of the thermal decomposition of the $N_2O$. As described above, in this thermal decomposition, the $N_2O$ begins to break down into smaller molecular fragments. As the $N_2O$ molecules fragment, the associated release of energy results in further heating of the remaining mixture. The increase both in temperature and the relative amount of gaseous products within the decomposition chamber 552 results in a rapid pressure rise in the decomposition chamber.

When the gas pressure within the decomposition chamber 552 exceeds the structural capability of the burst disc 542, the disc 542 ruptures or otherwise permits the passage of the hot decomposition products into the gas storage chamber 516. The pressurized gas stored within the gas storage chamber 516 is heated by contact with the hot decomposition gas formed in the decomposition chamber 552. The heated stored gas and the decomposition products flow into the diffuser assembly 526 and then out the diffuser outlet openings 534 into the inflatable vehicle occupant restraint 512.

It is to be appreciated with an assembly, such as shown in FIG. 5, the number of leak paths (particularly those which lead to the external surrounding environment) have been reduced or minimized. As a result, the reliability of such an assembly is enhanced.

Further, such an assembly is of reduced or minimized size and weight. Thus, serving to correspondingly reducing the costs associated therewith.

Still further, as such an assembly, for example, does not require the inclusion of fill ports and provides a long term leak detection capability, the assembly is or may have or result in improved reliability.

Figure 6:
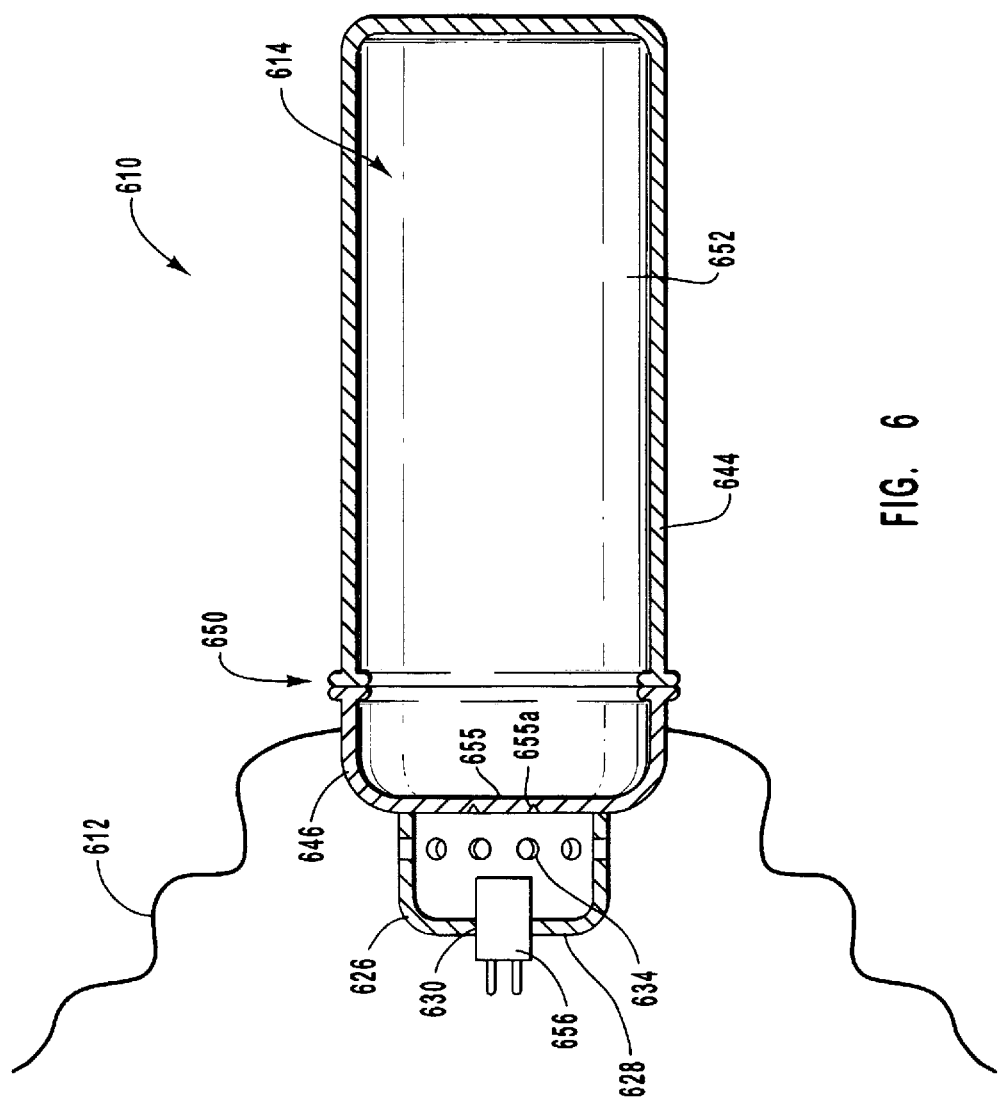
FIG. 6 is a simplified, partially in section, schematic drawing of an airbag inflator assembly in accordance with yet still another alternative embodiment of the invention.

FIG. 6 illustrates a vehicle safety apparatus, generally designated by the reference numeral 610, in accordance with yet still another alternative embodiment of the invention. The vehicle safety apparatus 610 is similar to the embodiments described above, includes an inflatable vehicle occupant restraint 612 and an inflator assembly 614.

The inflator assembly 614, however, differs from those described above in that it does not include a stored gas chamber. The inflator assembly 614, like the above-described inflator assembly 514, includes a decomposition chamber 652, a diffuser assembly 626 and an initiator device 656.

More specifically, in the inflator assembly 614, the decomposition chamber 652 is composed of a cap portion 644 and a base portion 646, joined or attached together in an appropriate manner, such as by an inertial weld 650. The decomposition chamber 652 contains, similar to the inflator assembly decomposition chambers described above, at least one gas source material which undergoes decomposition to form decomposition products including at least one gaseous decomposition product used to inflate the vehicle occupant restraint 612.

Similar to the inflator assembly 514, described above, the base portion 646 of the inflator assembly 614 includes a preweakened region 655 such as formed by the inclusion of a score 655a or area of reduced thickness to permit the base portion 646 to desirably specifically open in a manner such as described in greater detail below.

Similar to the inflator assembly 514, described above, the diffuser assembly 626 is joined or attached to the base portion 646, adjacent the preweakened region 655, in an appropriate manner, such as by an inertial weld. The diffuser assembly 626 includes a base wail 628 having an opening 630 therein wherethrough the initiator device 656 is attached in an appropriate manner such as with a weld or by crimping, for example. The diffuser assembly 626 also includes a plurality of openings 634, wherethrough the inflation gas from the inflator assembly 614 is properly dispensed into the occupant restraint 612.

The normal operation of the vehicle occupant safety apparatus 610 is as follows:

Upon the sensing of a collision, an electrical signal is sent to the initiator device 656. The initiator device 656 functions, causing the failure or opening of the preweakened region 646 of the base portion 646 of the decomposition chamber 652 and, when the initiator device 656 is a pyrotechnic-containing initiator, discharge of high temperature combustion products into the decomposition chamber 652 and the contents thereof, which in one embodiment includes gaseous phase $N_2O$.

With the opening of the preweakened region 646, some of the gas stored within the decomposition chamber 652 will pass into the diffuser assembly 626 and out the diffuser outlet openings 634 into the inflatable vehicle occupant restraint 612. Hot ignition products produced or resulting from functioning of the initiator device 656 cause decomposition of the nitrous oxide to proceed. As the decomposition of the nitrous oxide proceeds, gas begins to flow from the decomposition chamber 652 into the diffuser assembly 626 and out to the inflatable restraint 612.

Thus, the inflator assembly 614 is a single chamber inflator comprising a decomposition chamber 630 with no associated gas storage chamber.

It will be appreciated that such an inflator assembly, as compared to those described above, typically is advantageously composed of fewer parts and is smaller, lighter and simpler in design and construction.

It is to be understood that the discussions of theory, such as the discussions of radioactive decay and the detection of radioactive signals, for example, are included to assist in the understanding of the subject invention and do not limit the invention in its broad application.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An apparatus for inflating an inflatable device, said apparatus comprising:
   a first chamber containing at least one gas source material under pressure, said gas source material, upon initiation, resulting in an inflation fluid used to inflate the device;
   said first chamber also containing a quantity of at least one radioactive isotope leak trace material whereby fluid leakage from said first chamber can be detected; and
   an initiator to initiate the at least one gas source material of said first chamber.

2. The apparatus of claim 1 wherein said first chamber contains the radioactive isotope $Kr^{85}$.

3. The apparatus of claim 1 wherein said first chamber also contains a material which initially holds at least a substantial portion of the contained quantity of the at least one radioactive isotope.

4. The apparatus of claim 3 wherein said material which initially holds at least a substantial portion of the contained quantity of the at least one radioactive isotope is in the form of a solid.

5. The apparatus of claim 4 wherein said first chamber contains a quantity of the radioactive isotope $Kr^{85}$ and said solid material is effective in initially holding a substantial portion of the quantity of contained radioactive isotope $Kr^{85}$.

6. The apparatus of claim 5 wherein said solid material comprises ethyl cellulose.

7. The apparatus of claim 5 wherein said solid material comprises $BKNO_3$.

8. The apparatus of claim 7 wherein said solid material additionally comprises a metal.

9. The apparatus of claim 7 wherein said metal is magnesium.

10. The apparatus of claim 1 wherein said first chamber contains at least one gas source material which undergoes decomposition to form decomposition products including at least one gaseous decomposition product used to inflate the device.

11. The apparatus of claim 1 wherein said first chamber contains $N_2O$ as a gas source material which undergoes decomposition to form decomposition products including at least one gaseous decomposition product used to inflate the device.

12. The apparatus of claim 1 wherein said first chamber is wall enclosed and said enclosing wall is free of a fluid fill port.

13. The apparatus of claim 1 wherein said first chamber is substantially free of added inert gas.

14. The apparatus of claim 1 prepared by:
   placing a quantity of said at least one gas source material in solid form within said first chamber while said first chamber is in a partially open form, and closing said first chamber with said quantity of said at least one gas source material enclosed therewithin.

15. The apparatus of claim 14 wherein the solid form of said at least one gas source material placed within the partially open first chamber is cryogenically formed as a solid.

16. The apparatus of claim 1 wherein said first chamber contains at least some liquid.

17. An apparatus for inflating an inflatable device, said apparatus comprising:
   a first chamber containing at least one gas source material under pressure which undergoes decomposition to form decomposition products including at least one gaseous decomposition product used to inflate the device;
   said first chamber also containing a quantity of $Kr^{85}$ leak trace material whereby fluid leakage from said first chamber can be detected; and
   an initiator to initiate the decomposition of the at least one gas source material.

18. The apparatus of claim 17 wherein said first chamber contains $N_2O$ as a gas source material which undergoes decomposition.

19. The apparatus of claim 17 wherein said first chamber also contains a solid material which initially holds at least a substantial portion of the quantity of $Kr^{85}$.

20. The apparatus of claim 19 wherein said solid material comprises ethyl cellulose.

21. The apparatus of claim 17 wherein said first chamber contains at least one sensitizer material effective to accelerate the rate of the decomposition reaction present in an amount below the flammability limit of the contents of said first chamber.

22. The apparatus of claim 21 wherein said first chamber contains a solid material which initially holds at least a substantial portion of the quantity of $Kr^{85}$ and which solid material also is effective to accelerate the rate of the decomposition reaction.

23. A method for detecting the occurrence of a leak from an otherwise closed chamber containing a pressurized fluid wherein said chamber initially contains a selected quantity of at least one radioactive isotope leak trace material, said method comprising the step of measuring the change in the radioactive signals emanating from said chamber.

24. The method of claim 23 wherein said chamber contains the radioactive isotope $Kr^{85}$.

25. The method of claim 23 wherein said chamber also contains a gas source material which, upon initiation, results in an inflation fluid used to inflate an inflatable device.

26. A method for detecting the occurrence of a leak from an otherwise closed pressurized fluid-containing chamber of an inflatable restraint system inflator, the pressurized fluid comprising a gas source material which, upon initiation, results in an inflation fluid used to inflate an inflatable device, the chamber additionally initially containing a selected quantity of at least one radioactive isotope leak trace material, said method comprising the step of:
   measuring the change in radioactive signals emanating from said chamber.

27. The method of claim 26 wherein said chamber contains the radioactive isotope $Kr^{85}$.

28. A method comprising the steps of:

providing a cryogenically formed solid mass of a first material within an at least partially open chamber;

providing a selected quantity of at least one radioactive isotope leak trace material within the at least partially open chamber; and thereafter, closing the chamber to initially contain both the first material and the leak trace material.

29. The method of claim 28 wherein the cryogenically formed solid mass of the first material converts to form a fluid and increases the pressure within the closed chamber, said method additionally comprising the step of:

measuring the change in radioactive signals emanating from the chamber whereby the occurrence of a leak from the chamber can be detected.

30. In a method of loading a material into an apparatus for inflating an inflatable device, the improvement comprising the step of:

sealing a cryogenically formed solid mass of the material within a chamber of the apparatus.

31. The method of claim 30 wherein the material comprises a gas source material.

32. The method of claim 30 wherein the material comprises a gas source material which undergoes decomposition to form decomposition products including at least one gaseous decomposition product used to inflate the device.

33. The method of claim 32 wherein the gas source material comprises nitrous oxide.

34. The method of claim 30 wherein the material comprises nitrous oxide.

35. The method of claim 30 wherein said sealing step comprises inertially welding together first and second portions of the chamber.

36. An apparatus for inflating an inflatable device, said apparatus comprising:

a first chamber containing at least one gas source material fluid under pressure the gas source material fluid, upon initiation, resulting in an inflation fluid used to inflate the device and an initiator to initiate the at least one gas source material fluid of said first chamber wherein said first chamber is free of a fill port for passage of the gas source material fluid thereinto.

37. The apparatus of claim 36 wherein said first chamber contains at least one gas source material which undergoes decomposition to form decomposition products including at least one gaseous decomposition product used to inflate the device.

38. The apparatus of claim 36 wherein said first chamber contains $N_2O$ as a gas source material which undergoes decomposition to form decomposition products including at least one gaseous decomposition product used to inflate the device.

39. The apparatus of claim 36 prepared by:

placing a quantity of the at least one gas source material in solid form within said first chamber while said first chamber is in a partially open form, and closing said first chamber with the quantity of the at least one gas source material enclosed therewithin.

40. The apparatus of claim 39 wherein the solid form of the at least one gas source material placed within the partially open first chamber is cryogenically formed as a solid.

41. The apparatus of claim 40 wherein said first chamber is closed by means of an inertial weld.

* * * * *